Oct. 25, 1932.  
E. S. CORNELIUSSEN, CALLED CORNELL  
ELECTRICAL SWITCHING STATION  
Filed Feb. 15, 1929   11 Sheets-Sheet 1
1,884,580
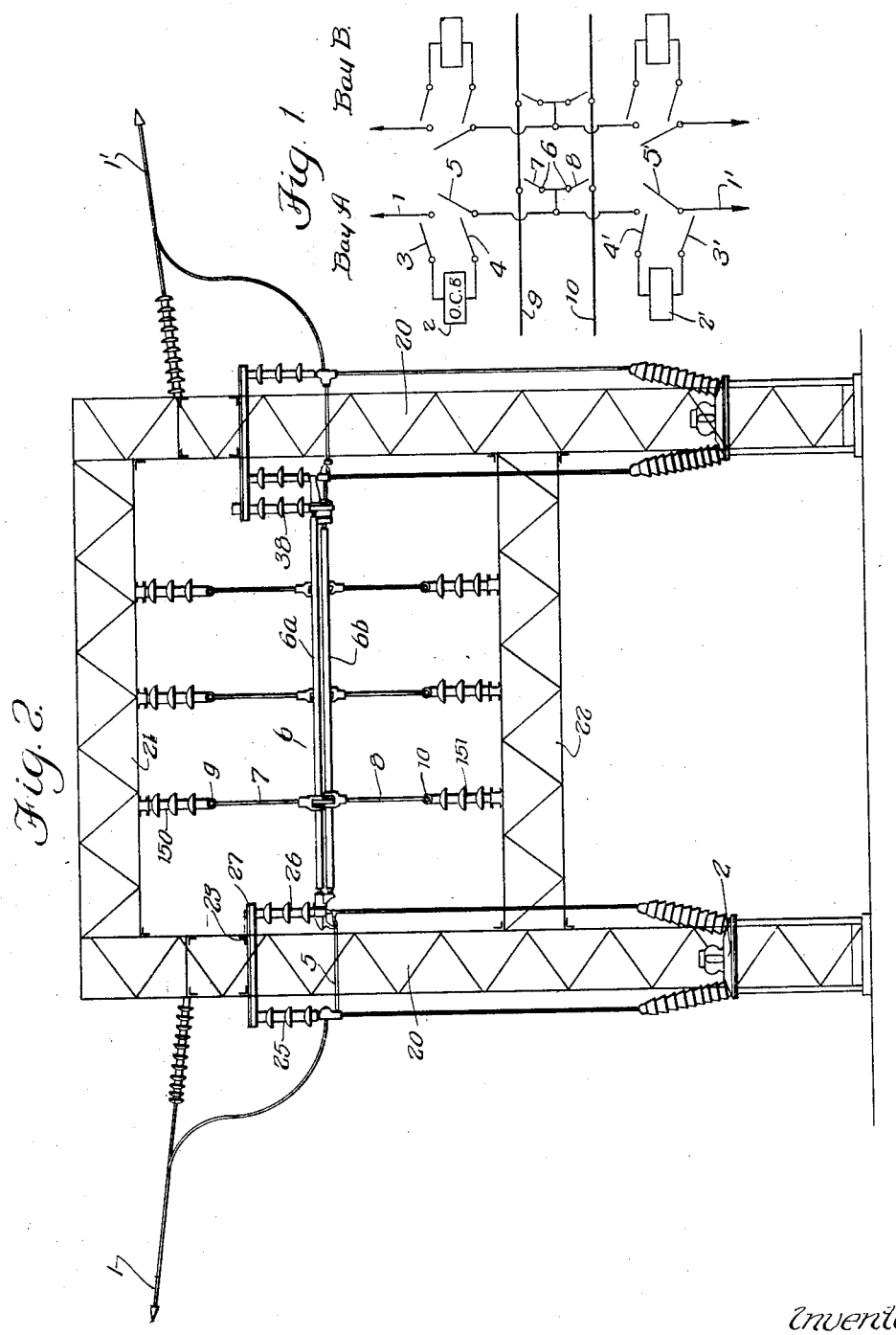
Witness  
William R. Kilroy
Inventor  
Elias S. Corneliussen  
By Brown Jackson Boettcher  
 Dienner   Attys.

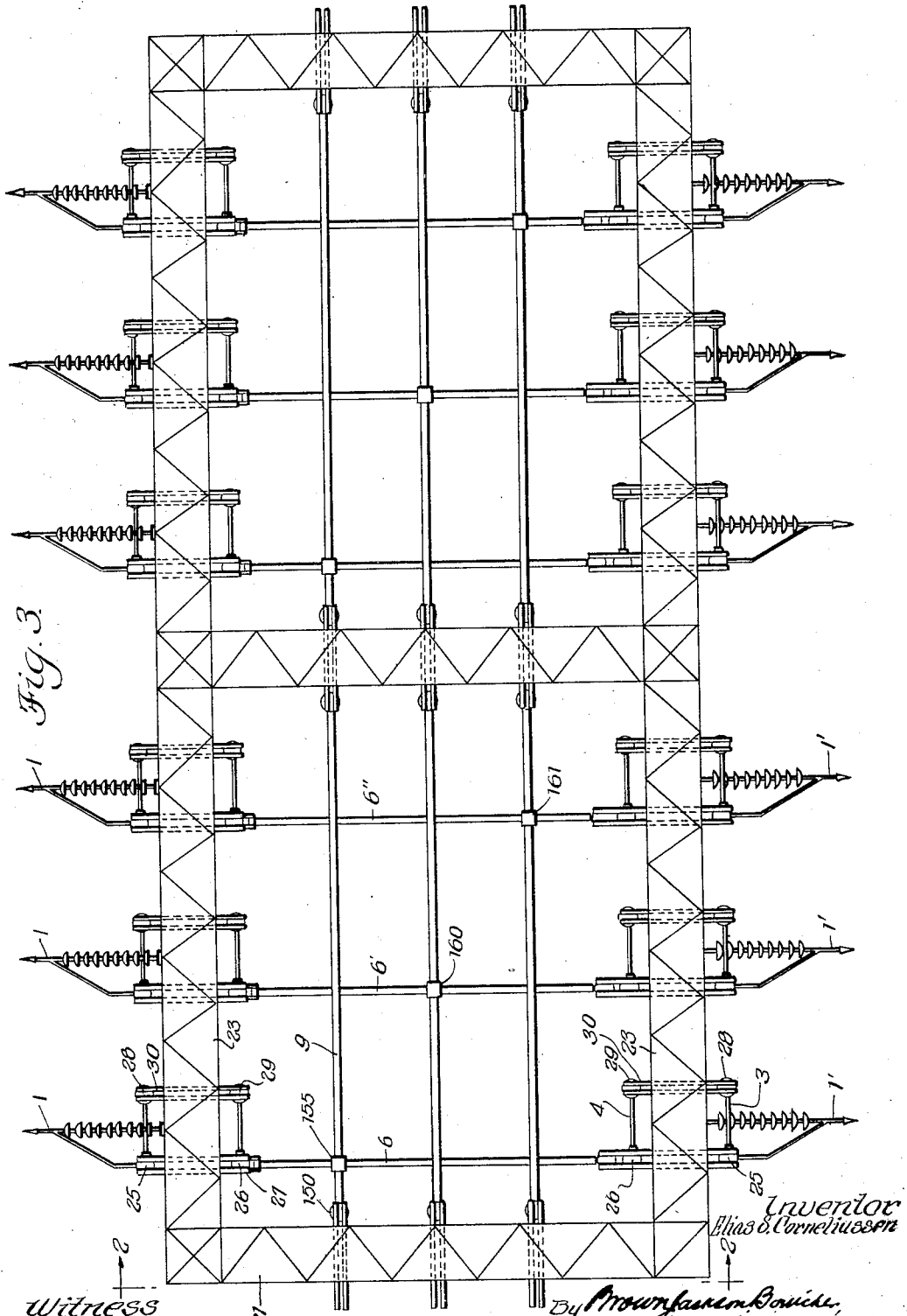

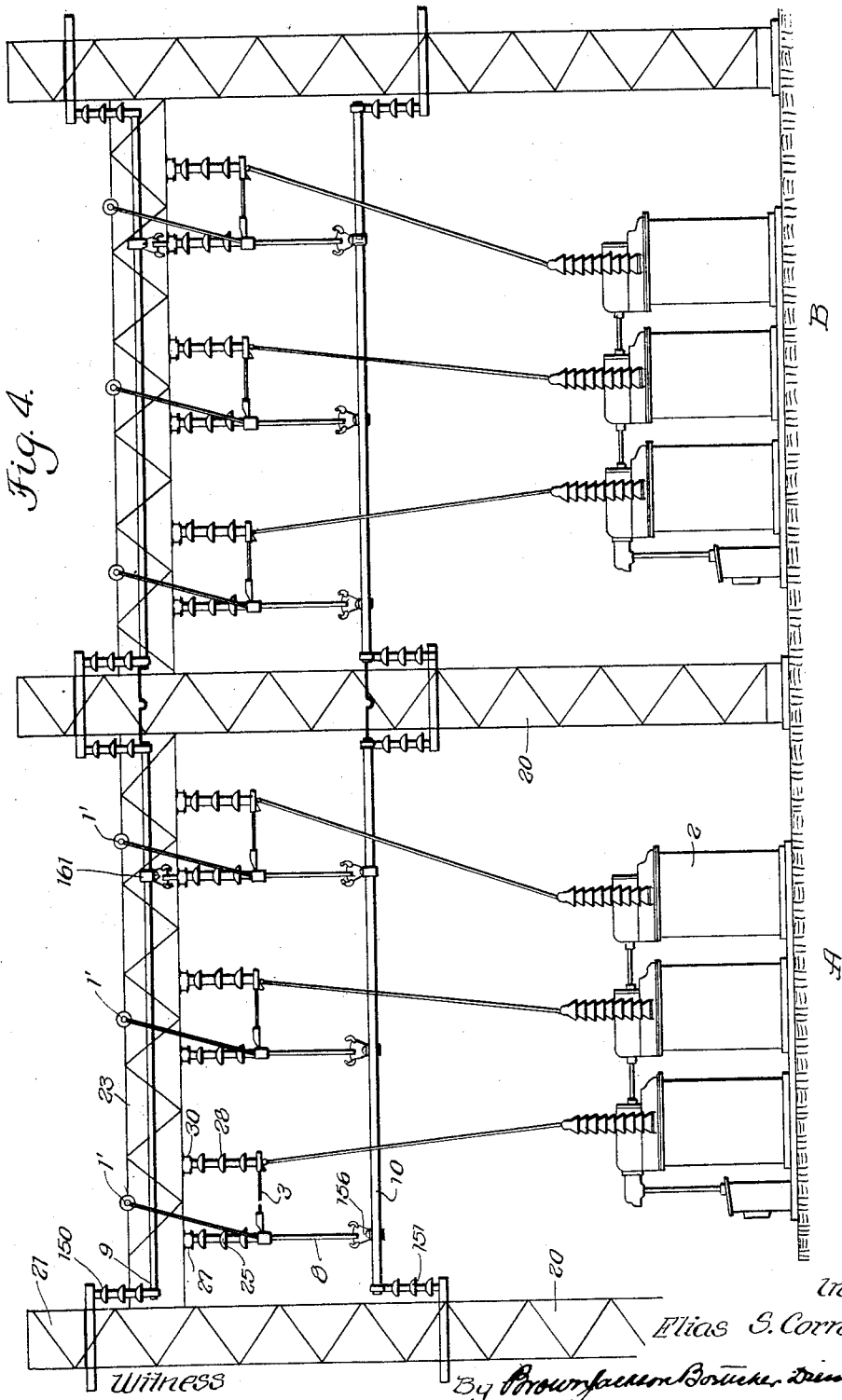

Inventor
Elias S. Corneliussen

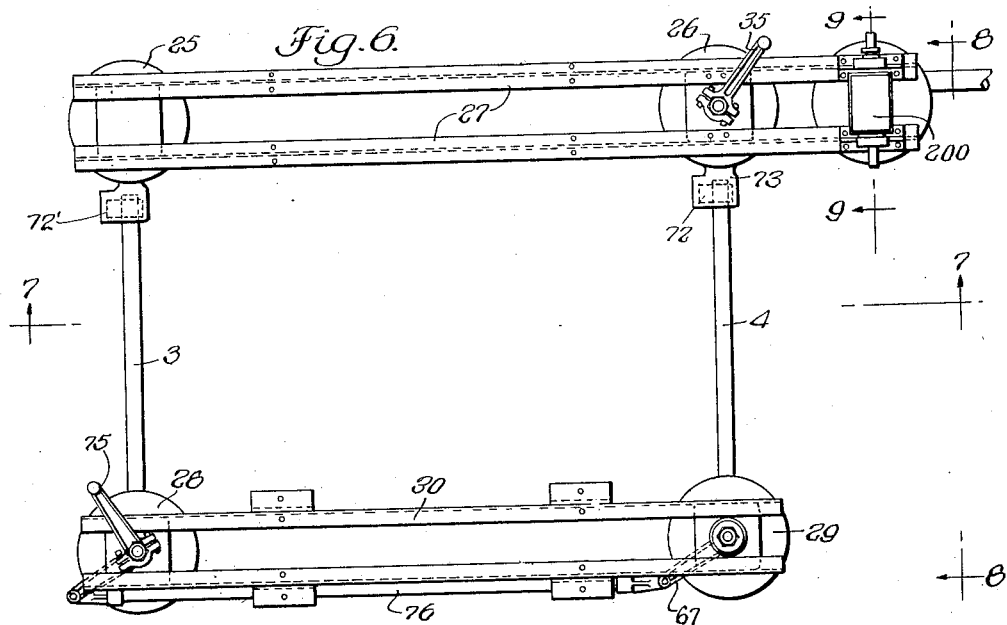
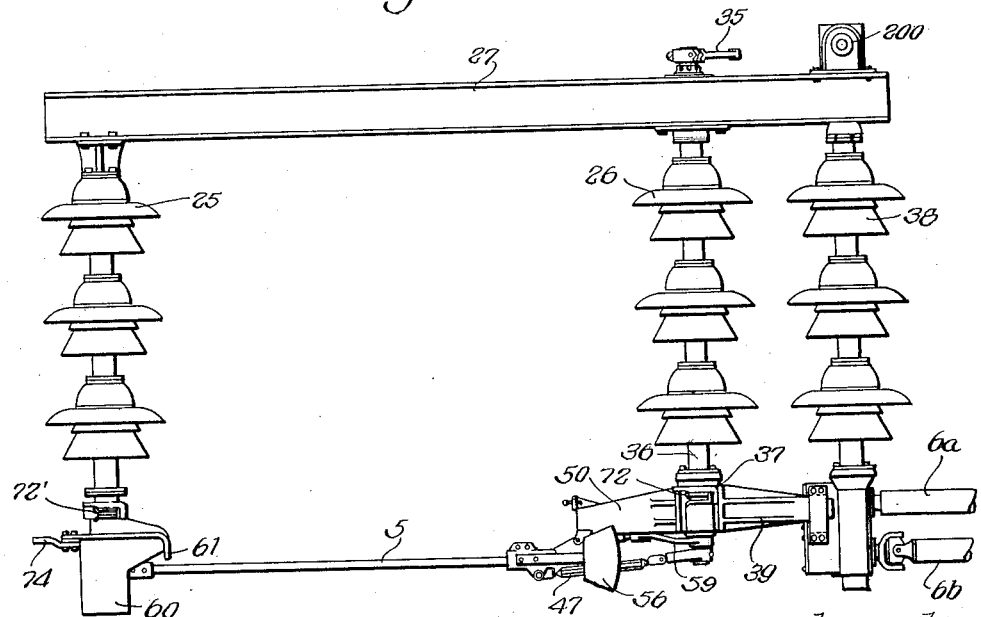

Oct. 25, 1932.    E. S. CORNELIUSSEN, CALLED CORNELL    1,884,580
ELECTRICAL SWITCHING STATION
Filed Feb. 15, 1929    11 Sheets-Sheet 6
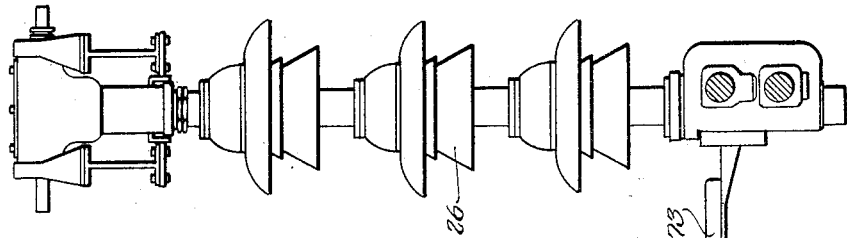
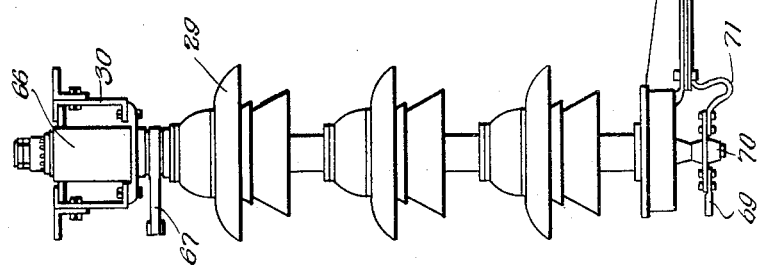
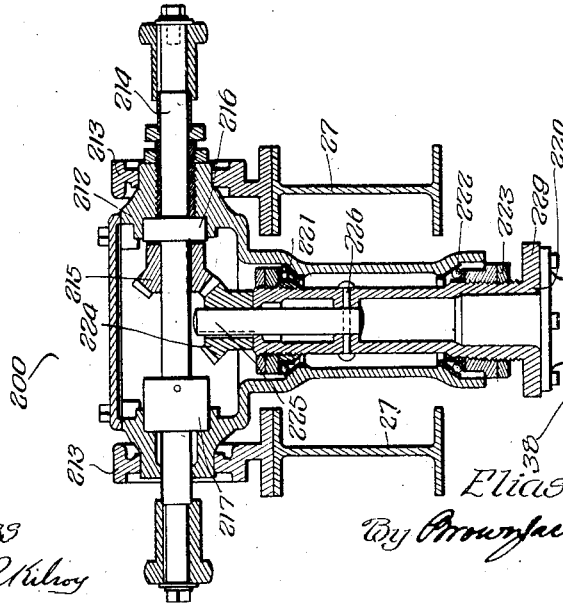
Inventor
Elias S. Corneliussen Oct. 25, 1932.  E. S. CORNELIUSSEN, CALLED CORNELL  1,884,580
ELECTRICAL SWITCHING STATION
Filed Feb. 15, 1929    11 Sheets-Sheet 7
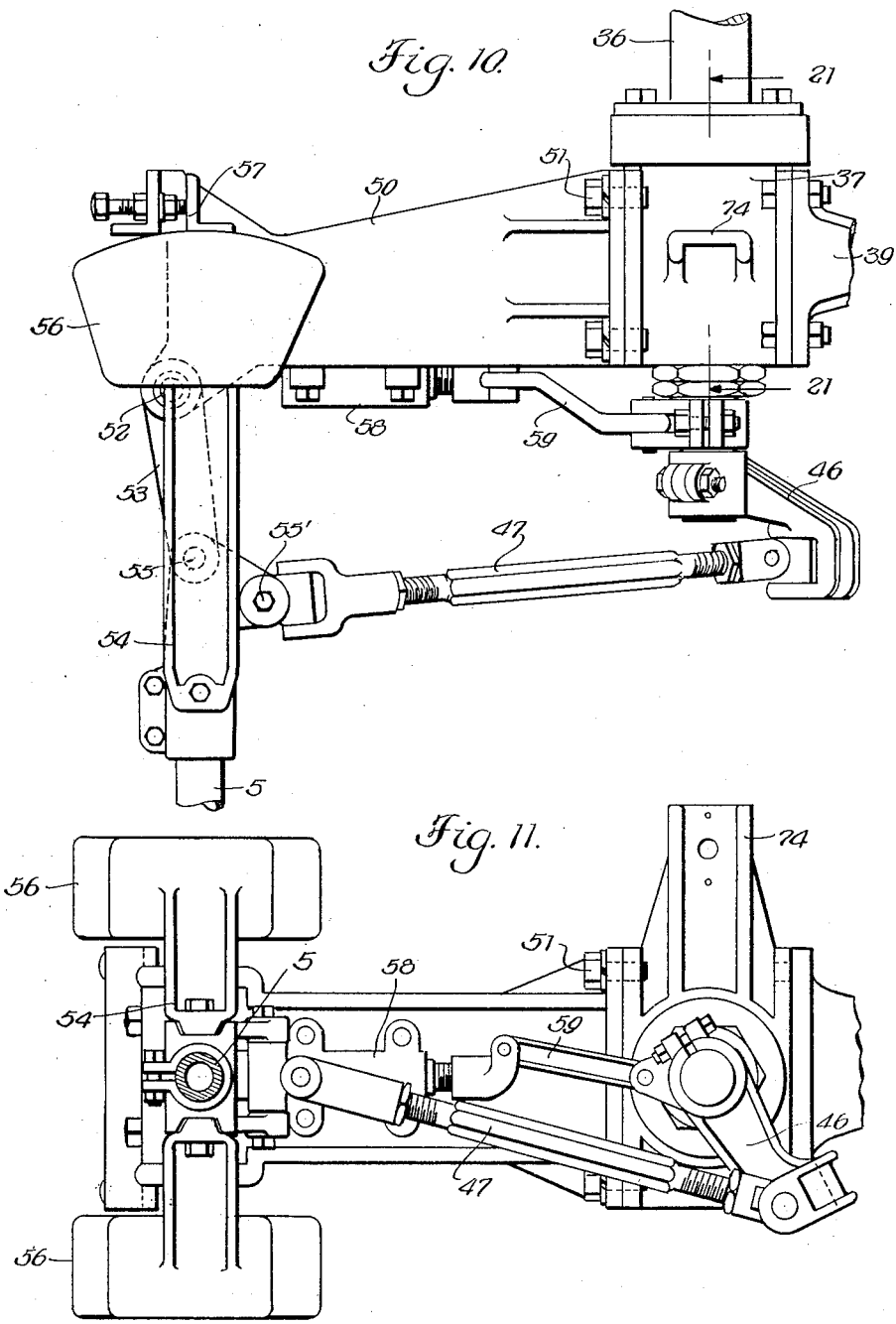
Witness
William P. Kilroy
Inventor
Elias S. Corneliussen
By Brown Jackson Boettcher Dienner
Attys.

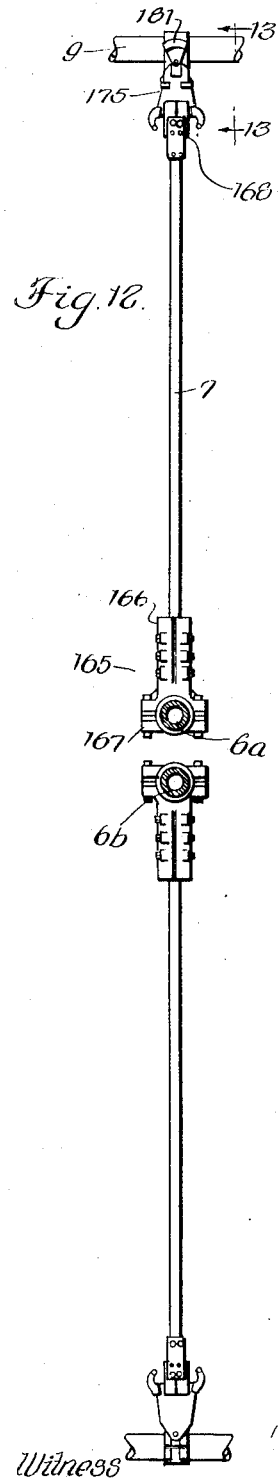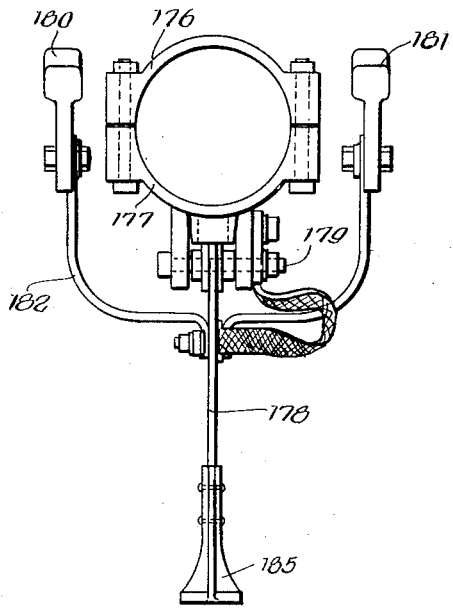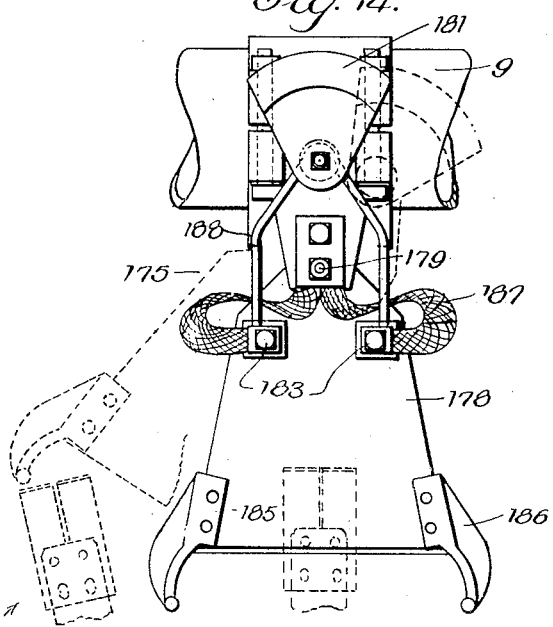

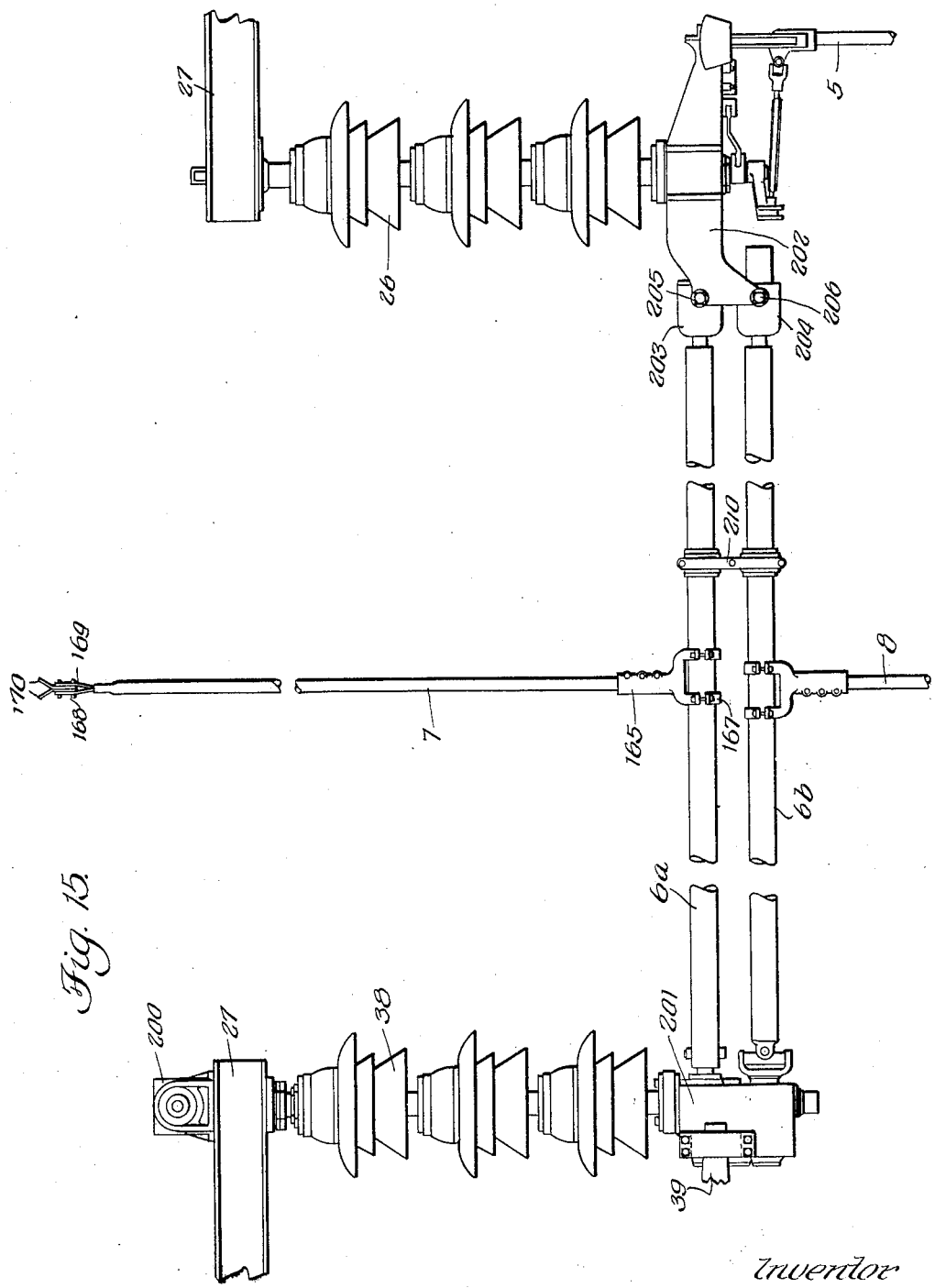

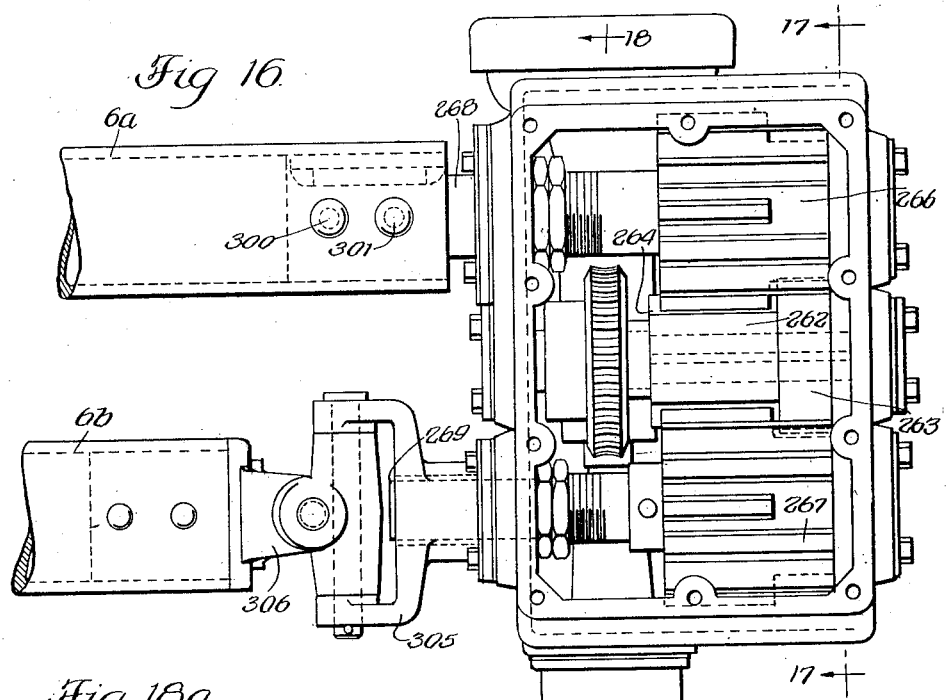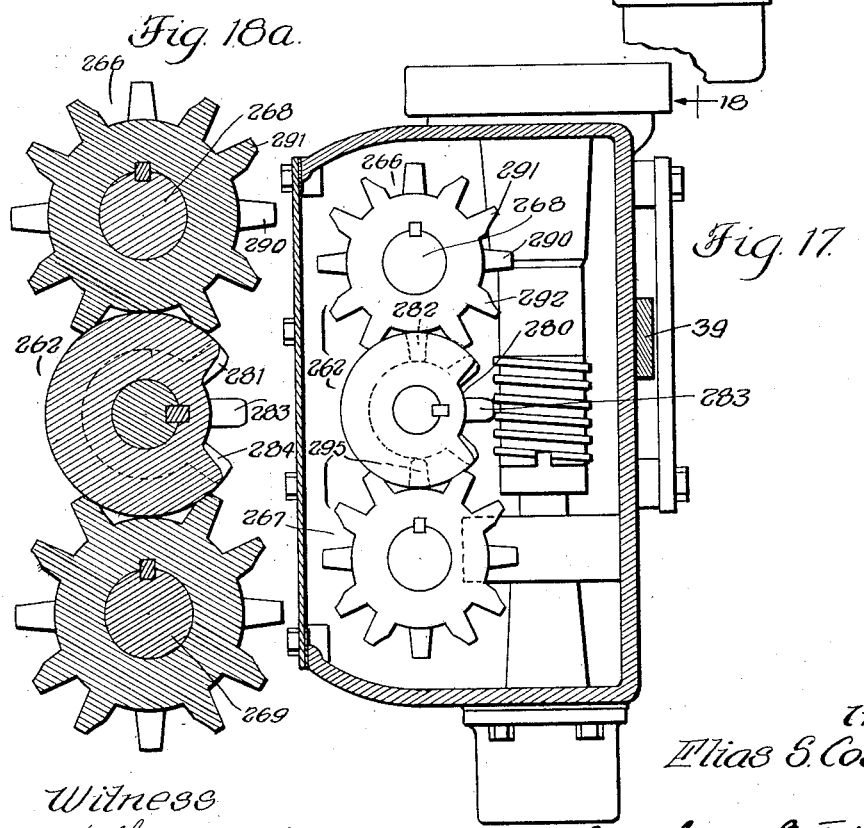

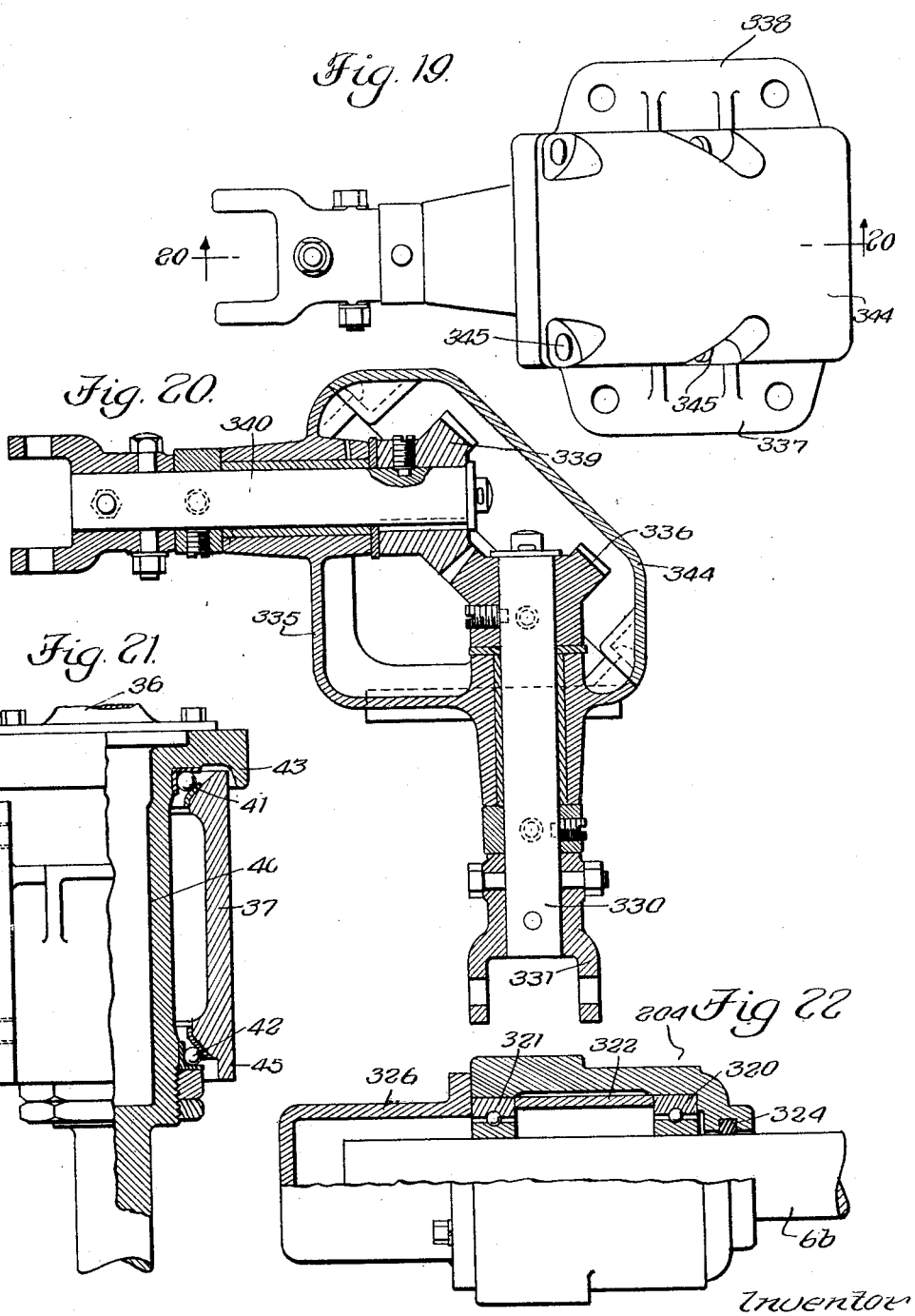

Patented Oct. 25, 1932

1,884,580

UNITED STATES PATENT OFFICE

ELIAS S. CORNELIUSSEN, CALLED CORNELL, OF CHICAGO, ILLINOIS, ASSIGNOR TO THE DELTA STAR ELECTRIC COMPANY, OF CHICAGO, ILLINOIS, A CORPORATION OF ILLINOIS

ELECTRICAL SWITCHING STATION

Application filed February 15, 1929. Serial No. 340,299.

This invention relates to electric switching stations, and it is an object of this invention to provide novel and improved power connections and switching means for controlling the distribution of power at the station, and especially at outdoor switching stations.

It is a more particular object of this invention to provide a novel, main and transfer bus arrangement and switching means for transferring the power connection from the main to the transfer bus, this being accomplished by the use of a rotatable line bus.

This invention contemplates the provision of a switching system for outdoor switching stations wherein there may be two circuits in each bay and wherein both circuits may be connected together without energizing either the main or the transfer bus, the system permitting the establishment of a connection to the busses when desired.

It is a further object of this invention to provide a switching system which will be safe and certain in its operation, which will require the use of a minimum number of oil circuit breakers, insulators, and disconnector switches, and which at the same time will be very flexible and will permit the connection of any line to the system, or the isolation of any line at will.

The attainment of the above and further objects of the invention will be apparent from the following specification taken in conjunction with the accompanying drawings forming a part thereof and showing the invention as applied to a high voltage station.

In the drawings:

Fig. 1 is a schematic single line diagram showing the present novel switching system, one phase only being shown;

Fig. 2 is an elevational view of the switching station, taken along the line 2—2 of Fig. 3;

Fig. 3 is a top view of the station;

Fig. 4 is a side view of the station;

Fig. 6 is a top view of one of the switch units;

Fig. 7 is a view taken along the line 7—7 of Fig. 6;

Fig. 8 is a view taken along line 8—8 of Fig. 6;

Fig. 9 is a sectional view of one of the bearings taken along the line 9—9 of Fig. 6;

Fig. 10 is an enlarged fragmentary view showing certain switch operating parts;

Fig. 11 is a bottom view of the parts shown in Fig. 10;

Fig. 12 is a view showing a pair of rotary bus switches;

Fig. 13 is an enlarged fragmentary view taken along the line 13—13 of Fig. 12 showing one of the bus switch contacts;

Fig. 14 is an enlarged front view of the contact;

Fig. 15 shows the rotary bus assembly;

Fig. 16 is a view showing the gearing for rotating the rotatable busses, the cover plate for the casing having been removed;

Fig. 17 is a view taken along the line 17—17 of Fig. 16;

Fig. 18a is an enlarged view of the "Geneva" gear movement;

Fig. 19 is a top view of a miter gear assembly for rotating the operating shaft;

Fig. 20 is a sectional view taken along the line 20—20 of Fig. 19;

Fig. 21 is an enlarged partial section showing the bearing for the switches shown in Fig. 10, said section being taken along the line 21—21 of Fig. 10; and Fig. 22 is a partial section showing the bearing for supporting the ends of the rotary bus to allow for expansion and contraction thereof.

Figure 18:
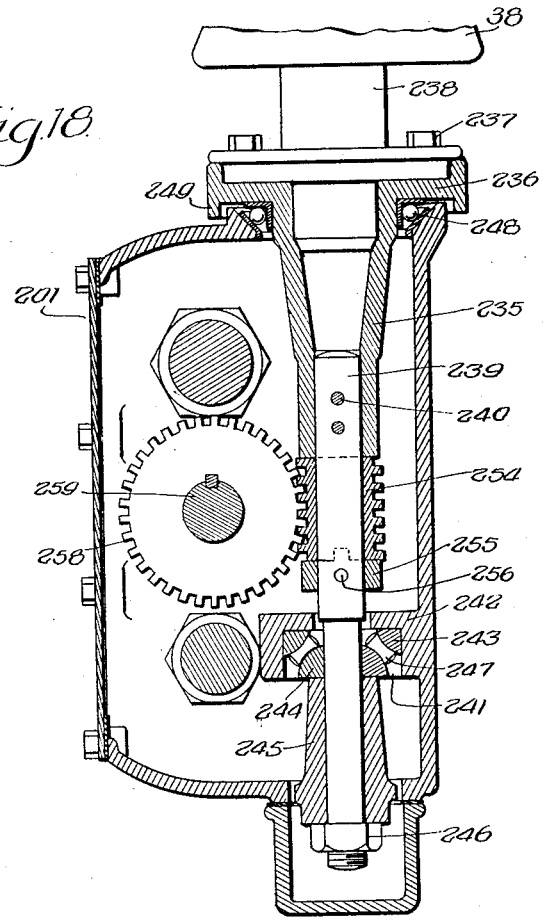
Fig. 18 is a view taken along the line 18—18 of Fig. 16.

Referring now more particularly to Fig. 1 of the drawings, 1 and 1' indicate two power lines one of which may be an incoming line and the other an outgoing line. Each line may be connected by way of an oil switch 2 and disconnect switches 3 and 4 to a rotatable line bus 6, or by means of disconnect switches 5 and 5' the lines may be directly connected to the bus without the use of the oil circuit breakers. The rotatable line bus 6 carries two switch arms 7 and 8 whereby connections may be established between the rotatable bus and either the main bus 9 or the auxiliary or transfer bus 10. The disconnect switches 7 and 8 are not rigid with respect to one another and it is possible to have the rotatable bus 6 connected to both busses 9 and 10 at the same time.

This is of particular importance for, with such an arrangement, it is not necessary to interrupt the current flow over the bus 6 upon changing from the main bus 9 to the auxiliary or reserve bus 10, or vice versa. When the disconnect switch 7 is closed and the bus 9 thereby connected to the bus 6, the auxiliary bus may be brought into service by first closing the disconnect switch 8 and then opening the disconnect switch 7. In the ordinary operation of the system, the disconnect switch 5 is open and the switches 3 and 4 are closed, thereby connecting the oil circuit breaker 2 in the circuit. Should it be desirable to disconnect the circuit breaker from the circuit for inspection or repair purposes, the switch 5 is first closed thereby short circuiting the breaker 2, and thereafter the switches 3 and 4 are opened thereby isolating the breaker from the line. To reconnect the circuit breaker in the circuit, the switches 3 and 4 are first closed and then the switch 5 is opened. By this arrangement, it is apparent that at no time is it necessary for the switches 3, 4, 5, 7 or 8 to interrupt a heavy current flow, for with respect to the switches 3 and 4, when they are opened to disconnect the circuit breaker from the line, the switch 5 is already closed thereby bypassing current that previously flowed through the circuit breaker.

It is apparent that the same is true when the switch 5 is opened at a time when the switches 3 and 4 are closed, for at such time the current that is interrupted upon the opening of the switch 5 is merely the current flow that results from the small voltage drop through the circuit breaker, which voltage drop is negligible. It is apparent from the circuit shown in Fig. 1 that power may be transferred between the lines 1 and 1' without energizing either the main bus 9 or the reserve bus 10. The circuit shown in Fig. 1 is for one phase only, and includes the connections in only two of the bays. It is, however, to be understood that there are a number of rotary busses such as the bus 6, one rotary bus being provided in each bay, said rotary busses being connectible to either the main bus 9 or to the transfer bus 10. It is further to be understood that in a three phase system, there are three busses such as the bus 9 and three transfer busses, one set of busses being provided for each bay, and in each bay there are three rotatable busses such as the bus 6, one rotatable bus being provided for each phase.

Reference may now be had to Figs. 2, 3 and 4 showing the physical layout of the busses, the circuit breakers, and the disconnect switches. These figures show two bays of a switching station, it being understood that as many bays as are necessary may be provided. The bus supporting structure comprises a trussed steel tower which, insofar as the present invention is concerned, may be of any preferred construction.

In general, the structure comprises a number of vertical supporting members 20 interconnected by a number of sets of horizontal members 21, 22, and 23. Insulator stacks 25—26 are suspended from a cross member 27 which is secured to the truss 23, and insulator stacks 28—29 are similarly suspended from a cross member 30 also mounted on the same truss member 23. The line 1 terminates at a contact at the bottom of the insulator stack 25, and a switch blade 5 at the bottom of the rotary insulator 26 is adapted to establish electrical contact with that line. Switch blades 3 and 4 carried at the bottom of the rotary insulators 28 and 29 are adapted to engage a contact at the bottom of the rotary insulator 25 and a contact at the bottom of the rotary insulator 26, respectively. A similar switching arrangement is provided for the line 1'. The switching arrangement for the line 1' includes in addition, a rotary insulator 38 for supporting and rotating the rotatable bus 6.

Reference may be had at this time to Figs. 6 to 11, inclusive, showing the switching arrangement including the switches 3, 4 and 5 of Fig. 1 and the supporting and operating means for the rotary bus 6 of Fig. 1. The supporting cross members 27 and 30 comprise two beams suitably bolted together. The insulator stack 26 is mounted in a suitable bearing between the beams 27 and is rotated by means of a crank handle 35 through the usual switch operating mechanism.

Secured to the insulator pin 36 at the bottom of the insulator stack 26 is a bearing member 37 (Figs. 10 and 21). An insulator stack 38 is supported from the cross member 27 in a manner to be more fully described hereafter. A bracket 39 connects the bearing 37 with the insulator stack 38, so that upon the rotation of the insulator pin 36 by the insulator 26, the bearing member 37 will not be rotated. The pin 36 is bolted to a spindle 40 (Fig. 21) which spindle rests in suitable ball bearing races 41 and 42 and is rotated upon the rotation of the insulator pin 36.

The top of the spindle 40 is provided with an enlarged portion providing an overhanging eave 43 to protect the upper bearing member from the entrance of moisture. An eave 45 at the bottom of the stationary portion of the bearing 37 protects the lower ball races from the entry of moisture therein. It is to be noted that there is sufficient clearance between the rotatable spindle and the outer shell 37 to prevent freezing together of the parts due to moisture that may rise by capillary action. A crank arm 46 (Fig. 10) suitably bolted to the bottom of the spindle 40 operates a connecting rod 47 for manipulating the switch blade 5. A bracket 50 is bolted at 51 to the bearing 37 and provides at the point 52 a support for the pivoted link 53. The link 53 is free to rotate about its support at 52. The other end of the link 53 is pivoted to the switch supporting bracket 54 at the point 55, and supports the bracket 54 at that pivot point. The connecting rod 47 is pivoted to the switch supporting bracket 54 at the pivot point 55′. A set of counterweights 56 mounted on the bracket 54 counter-balance the blade 5. A stop 57 carried by the counter-weight 56 limits the movement of the switch blade 5 in its opening movement to the position shown in Fig. 10.

Rotation of the crank arm 46 causes the connecting rod 47 to swing the switch blade 5 about its pivot 55 and likewise to swing the pivot 55 about its center 52 thereby causing the blade to move with a combined rotary and rectilinear motion to engage a contact within the housing 60. A stop limit 61 limits the extent of the closing movement of the switch blade 5. A locking mechanism 58 controlled by a connecting rod 59 operated by the rotation of the rotary insulator controls the lunging movement of the switch 5 in the manner more fully explained in the pending application of Alfred Alsaker & Erick Nordhem, Serial Number 194,608, filed May 27, 1927.

The switch 4 of Fig. 1 is shown in detail in Figs. 6 and 8. The switch includes an insulator stack 29 supported in a rotary bearing 66 held by the cross member 30, is rotated by means of a suitable crank arm 67, and has rigidly secured to the bottom thereof a switch blade 4. The lead in terminal 69 is supported by a bearing 70 at the bottom of the insulator stack, so that upon rotation of the insulator stack and the switch blade 4, the terminal 69 may remain stationary.

A flexible conductor 71 connects the lead in wire 69 with the switch blade 4. The switch blade 4 is rotatable in a horizontal plane to establish contact with a contact 72 within the housing 73. The housing 73 is carried at the bottom of the insulator stack 26, being bolted to the stationary outer portion of the bearing 37 at a supporting flange 74 shown more particularly in Fig. 10. The switch 3 supported from the insulator stack 28 is operated similarly to the switch 4, engaging a contact similar to the contact 72 carried at the bottom of the insulator stack 25. Suitable flexible lead in conductors (not shown) connect the terminal 74 with each of the contacts 72′ and with the contact within the housing 60. The switches 3 and 4 are operated in unison by means of a crank arm 75, said switches being connected by the rod 76. The rotary busses 6a and 6b are supported by the insulator stack 38 suspended from the cross member 27 and are rotated upon the rotation of the insulator stack in a manner to be presently more fully described. The switch blade 5, the stationary contact 72, and the rotary busses are connected together by means of flexible conductors so that the supporting bracket structure need not carry the current flowing.

The terminal 69 at the switch blade 4 and the similar terminal at the switch blade 3 are connected to the opposite sides of an overload circuit breaker in the manner shown in Fig. 1. An incoming line such as 1 is connected to the terminal 74 (Fig. 7). From the description thus far given, it may be seen that there has been provided a simple switching arrangement whereby connections may be established from a line such as the line 1 to the rotary bus such as 6 over a circuit such as shown in Fig. 1, the mechanical arrangement of the switches being such as to involve the use of the minimum number of insulators.

At this point, it may be well to turn back to Figs. 2, 3 and 4 in order that a clearer understanding of the mechanical arrangement of the various parts in the system may be had.

The main bus 9 is suspended from the truss member 21 by suitable insulators 150, whereas the auxiliary bus 10 is mounted on the truss member 22 by suitable insulators 151. The busses 9 and 10 extend parallel to one another and at right angles to the bus 6. The switch blades 7 and 8 are mounted upon the bus rods 6a and 6b of the bus 6 respectively and are each rotated with its bus rod. A contact secured to the main bus 9 at the point 155 (Fig. 3) cooperates with the switch blade 7 for the establishment of a connection between the bus 6 and the bus 9. A similar contact is secured to the lower bus 10 at a point immediately below the point 155, said contact being indicated at point 156 in Fig. 4.

The switch blade 8 is adapted to engage the contact 156 to establish a circuit between the bus 6 and the transfer bus 10. The bus rods 6a and 6b are rotated in a manner to be more fully described hereinafter so that the switch blades 7 and 8 assume the positions shown in Fig. 5 successively. It may thus be seen that the switch blade 8 engages the transfer bus 10 before the switch blade 7 leaves the main bus 9 and that upon the reverse rotation the switch blade 7 engages the main bus 9 before the blade 8 disengages the transfer bus 10. As a result of this arrangement the bus 10 is brought into service before the bus 9 is disconnected from service, thereby providing continuous service and also permitting the use of disconnect switches 7 and 8 rather than expensive oil circuit breakers. This is so for at the time that either of the switch blades is leaving its contact, the other blade is already in engagement with its contact thereby providing a different path for the current flowing through the bus bar 6 and avoiding the necessity of interrupting a large current flow.

It is, of course, understood that by continued rotation of the bus rods 6a and 6b, both of the switch blades 7 and 8 may be swung out of engagement with their contacts, thereby disconnecting the bus bar 6 from both the main bus 9 and from the transfer or auxiliary bus 10. It is, however, understood that the operator would never swing the bus 6 to disconnect both the switch 7 and the switch 8 unless previous to that time the bus 6 had been disconnected from the circuit at the circuit breaker, such as the circuit breaker 2.

In the embodiment of the invention as herein illustrated, a three phase system has been shown. It is, however, to be understood that the invention is not limited to a three phase system or to a system of any other particular number of phases. The switching arrangement for each of the other phases is similar to that already described. The rotary bus 6' for one of the other phases of the system is provided with switches such as 7 and 8 heretofore described which switches engage the upper and lower busses at the switch contact indicated at 160. The switches for a third phase 6'' engage the main and transfer busses at the switch contacts indicated at 161.

As may be clearly seen from Figs. 3 and 4, two bays A and B of a switch yard have been shown. The two bays are of similar construction and a description of the bay B need not be given. It is, of course, understood that the switch yards may comprise as many bays as are necessary and the present invention is not limited to the use of two or more bays. In the embodiment of the invention illustrated, each bay has two circuits, the circuit indicated at 1 and the circuit indicated at 1'.

The invention is, however, not limited to the use of two circuits per bay and, if desired, only one circuit per bay may be provided. If only one circuit per bay were needed or desired, then the circuit at 1' would be omitted, omitting the switches 3', 4', and 5', and their supporting insulators, retaining only the one insulator necessary to support and rotate the bus 6. The lines indicated at 1—1—1 in Fig. 3 are the lines of the respective phases of a three phase system, and the lines at 1' are the three lines of a three phase system constituting the second circuit in the bay.

Reference may now be had to Figs. 12, 13, 14 and 15 showing the mechanical construction of the rotary bus switch. The blades such as 7 and 8 are clamped to the rotatable busses 6a and 6b respectively, by means of forked clamps 165 consisting of upper and lower split portions 166 and 167 bolted together and embracing the rotary bus. The contact blade 168 is secured to the end of the blade 7 by means of two spring members 169 (Fig. 15). The two contacting members 170 are pressed together and supported by the springs 169 and are adapted to be spread apart upon engaging the contact carried by the stationary bus.

The contact 175 is clamped to the upper stationary bus 9 by means of a split clamp comprising the upper portion 176 and the lower portion 177.

A flat contacting plate 178 is pivoted at 179 to a downwardly projecting portion of the lower bracket member 177. A set of counter-weights 180 and 181 are rigidly secured to the contacting plate 178 by means of a bracket member 182 which is bolted or otherwise secured to the contacting plates 178 at 183. The contacting plate 178 together with the counter-weights 180 and 181 are free to swing about the pivot 179 as a center. The counter-weights are a good deal heavier than the contact plate 178, hence when the switch blade is not in engagement with the contact plate 178, the counter-weights will bias the plate in one direction or another from the mid position shown in Fig. 14 and the blade will assume a position such as shown in dotted lines in Fig. 14. It is, of course, understood that under other conditions the plate 178 may be swung to the right as seen in Fig. 14 instead of to the left. Abutment members 185 and 186 are secured to the contact plate 178 for a purpose which will be apparent as the description proceeds. The hinged contact plate 178 is electrically connected to the lower bracket member 177 by means of a flexible braided conductor 187 so that the current flowing through the blade to the bus 9 need not pass through the hinge 179.

Assume now that the contact 178 is in the position shown in dotted lines in Fig. 14 and that the switch blade 7 is being rotated into contact therewith.

If the direction of motion of the switch blade 168 is as indicated by the dotted arrow, then the upper right hand corner of the switch blade engages the plate 178, the contacts upon the blade 168 spreading to receive the plate. As the blade 7 is further rotated one end of the blade engages the abutment member 186 and, continued rotation of the blade to the full vertical position, which is the full closed position of the switch, will swing the contact 175 into the position shown in Fig. 14. When the blade 7 is swung out of engagement with the contact 175, whether the swinging motion be to the right or to the left as seen in Fig. 12, the contact 175 is swung around in one direction or the other. The counter-weights 180 and 181 continue the rotated movement until the stops 188 are encountered. Since the total rotative motion of the switch blade 7 is less than one complete revolution, the blade always approaches the contact from the same side that it had previously receded from the contact upon the preceding operation.

A description of the manner of supporting and of rotating the line busses 6 and 7 will now be given, for which reference may be had to Fig. 15. The insulator stack 38, rotatable about its own axis, is supported from the cross member 27 in a manner to be more fully described hereafter.

A supporting bearing 200 mounted on the cross member 27 supports the insulator stack and permits a limited rocking motion of the stack. An intermittent gear box housing 201 is bolted to a bearing at the bottom of the insulator stack 38, so that upon rotation of the insulator stack, the gear mechanism within the housing is rotated. The housing 201 is itself maintained stationary upon the rotation of the insulator stack 38 by the bracket member 39 (Fig. 7). The rotatable insulator stack 26 at the other end of the bay supports a bracket 202 which carries the bearing members 203 and 204 in which the other ends of the line busses 6a and 6b are rotatably supported. The bearings 203 and 204 are secured to the bracket 202 by means of cap screws 205 and 206. The bracket 202 is held against rotation upon the rotation of the insulator stack 26 by the rotatable busses held therein. The switch blades 7 and 8 are clamped to the rotatable busses in the manner previously described, and the two busses are strapped together by means of a link 210. A split collar is bolted to each of the rotatable busses and the link 210 clamps around the shells of the collar. In this manner the split link maintains the two busses a proper distance apart and distributes the stresses to both rotatable busses when either of the switch blades is pulled from or pushed into its contact. The collars to which the split clamp 210 is bolted are, of course, loose fitting so as to permit the free rotation of the busses within the respective collars.

A description of the gear assembly and the bearing 200 will now be given, and for this purpose reference may be had to Fig. 9. An enclosing shell 212 is rotatably supported in the members 213 which are mounted upon the cross members 27. The supporting housing 212 has a limited angular movement within its support 213. The operating shaft 214 is mounted in suitable ball bearings 216 and 217 at the opposite ends of the member 212, and has a miter gear 215 mounted upon it within the casing 212. The rotatable spindle 220 is supported at the ball races 221. The lower races 222 are provided to maintain the spindle in alignment, and may be adjusted at the lock nuts 223. A miter gear 224 in mesh with the gear 215, rotates the pin 225 which, by means of a connecting pin 226 rotates the spindle 220. The insulator stack 38 is supported by the spindle 220, being bolted thereto at the flanges 229. Upon rotation of the operating rod 214, it is apparent that the insulator stack at the bottom of the spindle 220 will be rotated. As stated above the entire miter gear assembly is hinged with respect to the cross member 27. The purpose of the hinged characteristic of the bearing 200 is to eliminate any binding in the bearings within the housing 201 at the bottom of the insulator stack 38. This binding would otherwise result from the sag in the rotatable busses due to ice or sleet that may form on the busses, as well as due to the push or pull upon the switch blades being transmitted to the busses, all in addition to the sagging that will naturally take place due to the weight of the busses themselves.

Because of this hinged characteristic, the cantilever strain in the insulator stack 38 due to the sagging of the rotatable busses is reduced to a minimum.

Reference may now be had to Figs. 16 to 18a, inclusive, showing the gear mechanism for obtaining the desired rotary movement of the line busses 6a and 6b. A spindle 235 having an enlarged head portion 236 is bolted by means of bolts 237 to the insulator pin 238 at the bottom of the insulator 38 (Fig. 18). The spindle extends into the intermittent gear box 201 and has a shaft 239 secured thereto by means of the pins 240. The gear box is supported from the shaft 239 at the bearing 241. For this purpose the gear box is provided with a projecting portion 242 which is provided with a ball or roller race 243. A cooperating race 244 is supported by the stem or sleeve 245 which is held in postion on the shaft by means of a nut 246. The nut 246 may be adjusted to take up the wear that may take place at the bearing. Suitable self-aligning rollers 247 are provided between the two races 242 and 243. An upper ball race 248 is provided for maintaining the spindles and gear box in proper alignment. The upper enlarged portion 236 of the spindle is provided with an overhanging eave 249 which acts as a water shed to prevent the entry of moisture into the upper bearing 248. The eave clears the gear box by a sufficient amount to insure against freezing together of the parts by moisture that may rise by capillary action. The balls are of hard steel, whereas the races are of comparatively soft unfinished metal so that if the parts should become frozen together by either moisture or corrosion, a relatively small amount of force will enable the balls to break away and permit the rotation of the member.

A worm 254 is keyed to the shaft 239 by means of a collar 255 which is pinned to the shaft by means of a pin 256. The worm 254 drives a worm wheel 258 which is keyed to the shaft 259. The shaft 259 has a combined gear and cam 262 keyed thereto (Figs. 16 and 17). The came gear 262 has a rear section 264 having only three teeth thereon and a front section 263 having a cam surface, Two similar gears 266 and 267 keyed to the respective shafts 268 and 269 are driven by the cam gear 262. The gear 266 has a front and a rear portion controlled by the front and the rear portion respectively of the cam gear 262. The gear 266 has a number of uniformly spaced gear teeth thereon, every third tooth being cut short so that at the rear portion of the cam gear 266 the teeth are uniformly distributed whereas at the front portion of the gear, that is, at the portion that is controlled by the portion 263 of the cam gear 262, every third tooth is missing. The periphery of the cam surface on the portion 263 of the driving cam gear rides in the space between adjacent teeth at the front portion of the cam gear 266 at the point where one of the teeth extends only at the rear portion of the gear, and until the cut away portion of the cam 263 indicated at 280 comes opposite the gear 266 there can be no rotation of that gear since the cam surface locks the gear 266. Assume a counter-clockwise rotation of the worm wheel that drives the cam gear 262. During the initial rotation of the cam gear 262 both the upper and the lower gears 266 and 267 are held against rotation.

When the tooth 281 at the rear portion of the driving cam gear engages the tooth 282 which extends only along the rear of the gear 266, the driving cam gear rotates the cam gear 266. During the next quarter of a revolution of the driving gear, the teeth 283 and 284 engage the next two teeth upon the rear portion of the gear 266. Further rotation of the driving gear 262 will not produce a further rotation of the gear 266 for two reasons. First, there being only three teeth along the rear portion of the driving gear, it is apparent that after those three teeth have passed out of engagement with the teeth on the driven gear, there will be no further rotation of the driven gear until the driving gear makes another revolution. In addition, the gear 266 has now rotated through a quarter of a revolution thereby bringing the portion of the gear surface having thereon the tooth 290 into the position previously occupied by the tooth 282. The tooth 290 extends only along the rear portion of the surface of the gear 266 and, therefore, the circular cam surface of the front portion 263 of the cam gear 262 may now ride in the space between the teeth 291 and 292 and thereby prevent the rotation of the gear 266. During the next three-quarters of a revolution of the driving gear, the driven gear 266 will remain stationary. It may thus be seen that for each revolution of the driving gear, the driven gear 266 will be rotated one quarter of a revolution and that the driven gear will be stationary during three quarters of the turning period of the driving gear.

During the time that the upper gear 266 is being rotated, the lower gear 267 is held stationary since the cam surface at the portion 263 of the driving gear occupies the space at the front portion of the gear 267 whereat a tooth is missing. Furthermore, at the time that any of the three teeth on the rear portion 264 of the driving gear are in engagement with the teeth on the upper driven gear 266, there are no gear teeth in engagement with the teeth at the rear portion of the lower driven gear 267. During the first quarter of a revolution of the rotation of the driving gear subsequent to the rotation of the upper gear 266, both the upper and the lower gear are maintained stationary. Further rotation of the driving gear brings the tooth 281 into engagement with the gear tooth 295 at the rear portion of the lower driven gear 267 and, during the next quarter of a revolution of the driving gear, the lower gear 267 is rotated through one fourth of a revolution. During the next quarter of a revolution of the driving gear, that is during the last quarter of the first revolution of the driving gear both driven gears again remain stationary, and subsequent rotation of the driving gear through another complete revolution will result in the successive rotation of the gears 266 and 267 each through a quarter of a revolution in the same manner as above. As is apparent from the structure disclosed, if the driving gear 262 is rotated in the opposite direction, the same cycle of operation will be repeated, in which case the driven gears will also be rotated in opposite directions.

The ends of the shaft 268 are journaled in suitable bearings in the ends of the housing 201 and one end of the shaft extends beyond the housing and into the tube comprising the upper rotatable bus 6a. The bus 6a is secured to the shaft 268 by means of two pins such as 300—301. The lower shaft 269 is also journaled in suitable bearings in the housing 201 and, to the end extending out of the housing, there is secured one half of a universal coupling indicated at 305. The lower rotatable bus 6b is secured to the shaft 269 by means of the other half of the universal coupling indicated at 306.

Figure 5:
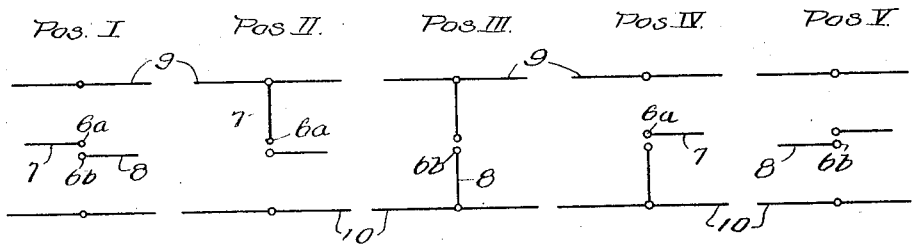
Fig. 5 is a schematic diagram showing the five possible positions of the switch blades on the rotary bus.

It is apparent from the above description that continued rotation of the insulator stack 38 will cause the rotary busses 6a and 6b to assume the successive positions shown in Figure 5. In position I the switch blades 7 and 8 are both out of engagement with the respective busses 9 and 10. In position II the switch blade 7 has been rotated into engagement with the main bus 9 whereas the switch blade 8 has remained stationary, that is, out of engagement with the transfer bus 10. In position III both switches 7 and 8 are in engagement with their respective busses. In moving from position III to position IV, the switch blades 8 remains stationary whereas the blade 7 is rotated out of engagement with the main bus 9. The continued rotation of the rotary insulator to bring the parts to the position indicated at V rotates the switch blade 8 out of engagement with the transfer bus 10 thereby again disconnecting the line bus 6 from both the main and the transfer busses 9 and 10, respectively.

It is understood that from any position of the parts except positions I and V the rotary insulator may be rotated in either direction to rotate the bus bars 6a and 6b to bring the switches 7 and 8 to either the succeeding position or to the preceding position.

The bearings such as 203 and 204 (Fig. 15) for supporting the other end of the rotary bus bars 6a and 6b are of the kind shown more particularly in Fig. 22. The shaft 6b extends into the shell of the bearing 204 and is supported therein by a set of ball bearings 320 and 321. A collar 322 maintains the ball races suitably spaced apart. The bearing is filled with a suitable lubricant for reducing the friction between the rotating parts and a suitable felt gasket 324 is provided for preventing the leakage of the lubricant where the bus enters the bearing. A cover 326 is bolted to the other end of the bearing, a suitable packing being provided between the cover and the shell of the bearing for preventing the escape of the lubricant at that point. The bus bar 6b is freely slidable within the bearing to allow for the expansion or contraction of the bus bar. The bearing 204 is suitably supported from the bracket 202 as shown in Fig. 15.

An explanation will now be given of the manner of assembling the rotary bus 6 and for this purpose reference may be had to Fig. 15. The insulator stack 26, as well as the switch mechanism and the bracket 205 mounted thereon is first mounted on the cross member 27 which is secured to the truss structure shown in Figs. 2, 3 and 4.

The hinged bearing 200 shown more particularly in Fig. 9 together with the insulator stack 38 is mounted upon the cross member 27 at the other side of the bay. At this time the gear mechanism 201 is not yet mounted upon the insulator stack 38.

On the ground, the upper rotatable bus 6a is keyed and bolted to the corresponding shaft of the intermittent gear box 201 and on the opposite side of the bus 6a the bearing 203 is attached to the bus 6a. This entire assembly is now hoisted up and the intermittent gear box 201 is bolted to the lower end of the insulator stack 38 with four cap screws 237 shown more particularly in Fig. 18.

As the rotatable stack 38 has a hinged characteristic, the mounting of the intermittent gear box 201 to the stack is easily accomplished, as the whole assembly has the effect of a universal coupling. As soon as the intermittent gear box is bolted in place, the opposite ends of the rotatable bus 6a is swung into place between the arms of the bracket 202. Although there is no universal coupling between the bus 6a and the intermittent gear box 201, this swinging action is possible because of the hinged characteristic of the bearing 200 as previously described, the bus 6a, the gear box 201 and the insulator stack 38 swinging as a unit about the bearing 200. The bearing 203 is then bolted in place between the arms of the bracket 202 by means of two cap screws 205.

The lower bus 6b is next to be mounted in position. A bearing 204 similar to the bearing 203 is attached to one end of the bus 6b and one half of the universal coupling 306 (Fig. 16) is attached to the opposite end of the bus. The other half of the coupling is already mounted on the intermittent gear box. The bus is now hoisted up and one pin is inserted to complete the universal coupling and the mounting of one end of the bus. The opposite end of the bus, that is the end with the bearing 204 is swung into its place between the bracket arms 202 and mounted with two cap screws 206, the universal coupling permitting the swinging action in spite of the fact that the intermittent gear box is held more or less rigid by the bus 6a already secured in place.

The tie link 210 is next to be mounted. As previously stated the link 210 consists of four half shells which are clamped around the two rotating busses, and a split link clamped around the shells completes the tie link, maintaining the two busses the correct distance from each other.

From the above description, it may be seen that the hinged characteristic of the bearing 200 is useful not only in avoiding binding of the mechanism within the intermittent gear box 201 due to the sagging of the rotary busses and likewise to prevent or reduce the cantilever stresses in the insulator stack 38 due to the sagging of the busses, but also this hinged characteristic of the bearing greatly facilitates the work of assembling the switch mechanism.

The rotary busses 6' and 6" (Fig. 3) are rotated in the same manner as is the bus 6, all the busses being gang operated. For this purpose, the operating shafts such as 214 (Fig. 9) for rotating the insulators such as 38 of the respective phases are interconnected. Any suitable form of coupling between the operating shaft of the bearings 200 of the respective phases may be provided. The operating shaft 214 extending through the bearings 200 of the various phases is rotated either manually or by means of a motor. An operating shaft extends vertically to the level of the shaft 214 and is coupled thereto by means of the miter gear assembly shown more particularly in Figures 19 and 20. The vertical operating shaft is coupled to the pin 330 by means of a universal joint indicated at 331. The pin 330 extends into the housing 335 and has a miter gear 336 keyed thereto. The housing 335 is provided with two flanges 337 and 338 whereby the same may be secured to the steel supporting structure of the system. A miter gear 339 in mesh with the gear 336 is pinned to the shaft 340 and rotates the same. The shaft 340 is coupled to the shaft 214 of Fig. 9 by means of any well known universal joint. A cover 344 is removably secured to the housing 335 by means of screws 345 and protects the miter gears from the elements.

From the description thus far given, it is apparent that I have produced a switching system which is exceedingly flexible and at the same time is quite simple in its operation and also cheaper to construct in that the switching system shown is quite compact thereby saving on the amount of space necessary therefor, and that the amount of steel and number of insulators used is considerably less than what was heretofore used. By clamping the bus selector switches directly to the main and transfer busses respectively and by providing a rotary bus carrying switch blades adapted to engage the switches clamped upon the main and transfer busses, I have eliminated all the idle tie connections that have been previously used between the busses and the bus disconnect switches.

The saving in insulators may be seen when it is noted that I require only nine individual insulator stacks for supporting the eight switches per phase for a double circuit bay such as shown in Fig. 1. These nine insulators do not, of course, include the insulators required to support the main and reserve busses as those insulators are also required in the switching systems heretofore used. Since each insulator added increases the hazard of flash-overs during voltage disturbances, this elimination of insulators is desirable apart from costs.

The super-imposing of one bus above the other greatly simplifies the structural layout by reducing the width of the structure. This allows a more compact grouping of oil circuit breakers and accessory equipment.

The bus selector switches, that is, the switches mounted on the rotary line bus, can be operated by a common operating mechanism from the ground level, assuring at all times a correct cycle of operation through the medium of the interlocked intermittent gear train. Such construction simplifies electrical interlocks when used.

The rotary busses in each bay are operated in unison from a common mechanism. If desired, the rotary busses of the various bays may be operated from the same operating mechanism, or separate operating mechanisms may be provided for the respective bays. It is to be noted that the busses 9 and 10 of the respective bays are electrically connected. A conductor connecting the busses 9 of the two bays and another conductor connecting the busses 10 of the two bays is seen in Figure 4. When necessary this conductor tie between the busses 9 and 10 of adjacent bays may be removed, thus isolating the bays.

The present bus construction permits the upper bus to be killed and made accessible for inspection and repair without interfering with service or endangering the maintenance crew, as the feeders can be fed to or from the lower bus. The lower bus can be killed likewise, and it is readily accessible from below.

The present arrangement further affords increased electrical flexibility as it is possible to cut feeder to transformer bank in the same bay, or feeder to feeder in the same bay, without energizing either main or reserve bus. This allows either the transformer or feeder oil circuit breaker to be by-passed without sacrificing protection, for with lines such as 1 and 1' in series and disconnected from both the main and from the transfer bus, either circuit breaker may be by-passed as the other circuit breaker will still afford the necessary protection.

If the rotating bus is disconnected from both the main and from the transfer bus, then all bays can be fed independently of one another from feeder to feeder or from feeder to transformer as the case may be. Also by switching to either bus a combination of two independent groupings of bays along with any number of individual bay feeds can be obtained.

The disposition of the circuit breakers 2 and of the busses, with respect to the steel supporting structure is such as to reduce the amount of copper used to a minimum. The circuit breaks being located immediately below the switches to which they are to be connected, there is a considerable saving of copper and simplification on that score. The bays are disposed one next to one another and the main and transfer busses extend lengthwise of the bays thereby providing a structure which may be expanded at will by adding more bays, the amount of copper necessary in tying the bays together being practically insignificant.

Other advantages of the present system, it is believed, will be apparent to those skilled in the art.

In compliance with the requirements of the patent statutes, I have herein shown and described a preferred embodiment of my invention. It is, however, to be understood that the present invention is not limited to the precise embodiment herein disclosed, the same being merely illustrative of the invention. What I consider new and desire to secure by Letters Patent is:

1. In an electric system, two power lines, a main bus, a transfer bus, and selector switches common to both lines for selectively establishing a connection between those lines and either bus.

2. In an electric system, two power lines, a main bus, a transfer bus, selector switches common to both lines for establishing a connection to either bus, and switching means associated with each line for establishing a connection to the selector switches.

3. In an electric system, two power lines, a main bus, a transfer bus, selector switches common to both lines for establishing a connection to either bus, and switching means associated with each line for establishing a connection to the selector switches, said switching means being operable to interconnect both lines independently of the busses.

4. In an electric system, two power lines, a main bus, a transfer bus, selector switches common to both lines for establishing a connection to either bus, and switching means associated with each line for establishing a connection to the selector switches, said switching means being operable to interconnect both lines independently of the busses by connecting both lines to the common selector switches.

5. In an electric power system, two power lines, switching means for interconnecting the lines independently of the hereinafter mentioned busses, a main bus, a transfer bus, and means for connecting either of the power lines to either of the busses selectively.

6. In an electric power system, two power lines, a main bus, a transfer bus, and means for connecting either of the lines to either of the busses, said means including means for interconnecting the lines independently of the busses.

7. In an electric switching system, a plurality of incoming lines, a plurality of outgoing lines, line busses, one for each incoming line, means for connecting each incoming line to a line bus, means for connecting each outgoing line to a line bus, a bus common to said line busses and means for connecting any line bus to said common bus, whereby power may be fed to the respective outgoing lines by way of the common bus or independently thereof as desired.

8. In an electric system, a main bus, a transfer bus, a third bus, means for connecting said third bus to either the main or to the transfer bus, two lines, and means associated with each line for connecting it to the third bus, whereby either of the lines may be connected to either of the first mentioned busses or the lines may be connected together independently of the first mentioned busses at will.

9. In an electric system, two spaced busses, a third bus between said two busses, said third bus including two parallel movable members electrically connected together, switching means carried by said members, and means for alternately moving said members to bring said switching means into and out of engagement with the two spaced busses.

10. An electric switching system including a plurality of bays there being two circuits to each bay, first and second busses, means for connecting the two circuits of each bay together independently of the busses and maintaining the sets of connected circuits separate from one another, and means for interconnecting the circuits of the respective bays through either of the busses.

11. In an electric system, a line, a bus, a circuit breaker, switching means for connecting the two sides of the circuit breaker to the line and to the bus respectively, and switching means for by-passing the circuit breaker whereby the circuit breaker may be isolated, both of said switching means having parts supported by a common insulator.

12. In an electric system, a bus structure comprising two mechanically and electrically connected members, switching means carried by the members, a main and a transfer bus, and means for independently rotating the two members to bring the switching means into and out of electrical connection with the main bus and with the transfer bus.

13. In an electric system, a bus, and insulators for supporting the ends of the bus, one of said insulators being pivotally mounted to permit a swinging motion of the supporting end of the insulator in line with the bus whereby bending stresses in the insulator are avoided when the bus sags, and means for rotating said one insulator about an axis at right angles to the axis about which it pivots.

14. In an electric system, a rotatable insulator, a gear housing mounted thereon, a rotatable bus supported by the gear housing and maintaining the housing against rotation upon the rotation of the insulator, and gear mechanism within the housing and operated by the rotary insulator for rotating the bus.

15. In an electric system, a rotatable insulator, a gear housing mounted thereon, a bus comprising two parallel individually operable members supported by the housing, said bus maintaining the housing against rotation upon the rotation of the insulator, and gear mechanism within the housing and operated by the rotary insulator for successively operating the bus members, said gear mechanism including means for locking each bus member against operation while the other bus member is being operated.

16. In an electric switching system, a rotatable insulator, a rotatable bus supported at one end by the insulator, and switch gear carried by the insulator and held by the bus against rotation as a rigid body with the insulator, said switch gear being operated by the insulator.

17. In an electric system, a rotatable insulator, switch gear operated thereby, a second rotary insulator, a second switch gear operated by the second insulator, a bus supported at its opposite ends by said insulators and operated by said first mentioned switch gear, and a switch blade operated by the second mentioned switch gear, said bus preventing the rotation of at least one of said sets of switch gear as a rigid body with its insulator.

18. In an electric switching system, a pair of rotatable insulators, two sets of switch gear supported by said insulators and operated by the respective insulators, and a bracket between the insulators for preventing the rotation of one of said sets of switch gear as a rigid body with its insulator.

19. In an electric switch, a rotatable insulator, switching gear and a switch blade supported and rotated thereby, said switch blade being rotated by said switch gear about an axis non coincident with the axis of rotation of the insulator, an additional rotatable member, and means whereby the additional rotatable member prevents the rotation of the switch gear with the insulator as a rigid body.

20. In a switching system, an insulator stack, a contact assembly carried thereby, and two switch blades rotatable in planes at right angles to one another for engagement with said contact assembly, and insulator stacks parallel to the first mentioned stack for rotating the respective blades.

21. In a switching system, an insulator, a stationary contact assembly and a movable switch blade carried thereby, said contact assembly and blade being electrically connected, means for rotating the blade, a second insulator, and a second blade rotated by the second insulator into and out of engagement with the contact assembly.

22. In a switching system, an insulator, a stationary contact assembly and a movable switch blade carried thereby, said contact assembly and blade being electrically connected, means for rotating the blade, a second insulator, and a second blade rotated by the second insulator into and out of engagement with the contact assembly, said two blades being rotated in planes substantially at right angles to one another.

23. In a switching system, an insulator, a contact assembly carried thereby, a second insulator, a switch blade rotated by the second insulator into and out of engagement with the contact assembly, a contact assembly carried by said second insulator and in electrical connection with the switch blade, a third insulator, and a switch blade rotated by the third insulator into and out of engagement with the second contact assembly.

24. In a switching system, an insulator, a contact assembly carried thereby, a second insulator, a switch blade rotated by the second insulator into and out of engagement with the contact assembly, a contact assembly carried by said second insulator and in electrical connection with the switch blade, a third insulator, a switch blade rotated by the third insulator into and out of engagement with the second contact assembly, an additional contact assembly carried by the first mentioned insulator, a fourth insulator, and a switch blade rotated by the fourth insulator into and out of engagement with said additional contact assembly.

25. In a switching system, four spaced insulators, contact assemblies carried by two of the insulators, switch blades carried by the other two insulators and movable into and out of engagement with the contact assemblies, means for moving the switch blades in unison, and an additional switch blade carried by one of the contact assembly carrying insulators and movable into and out of engagement with the contact assemblies carried by the other insulator.

26. In a switching system, four vertical insulators, switch blades carried by two of the insulators, cooperating contacts for the respective blades carried by the other two insulators, and a switch blade carried by one of the contact carrying insulators and in electrical engagement with one contact, said last mentioned blade being movable into and out of engagement with the contact carried by the other contact carrying insulator, said blade carrying insulators constituting the means for moving the blades into and out of engagement with the contacts.

27. In an electric switching station, a main bus, a transfer bus, a rotary line bus disposed between the two, switching means carried by the rotary bus and rotated thereby for connecting said rotatable bus to either the main or to the transfer bus, a rotatable insulator supporting one end of the rotary bus, means carried by the insulator for rotating the bus, a second rotary insulator adjacent the first insulator, a switch blade, switch gear between said blade and said second insulator for rotating the blade, said blade being connected to the bus, and connections between the two insulators whereby the first insulator prevents the rotation of the blade and the switch gear as a rigid system with the second insulator.

28. In a switching station, three parallel side by side busses, three additional busses parallel to and spaced from the first mentioned busses, three movable switching busses disposed between said two sets of busses, each of the switching busses comprising two separately movable parallel bars, said switching busses extending at right angles to the other busses, and switch blades carried by said switching busses and movable into and out of engagement with the other busses.

29. An outdoor switching station comprising an elevated double deck rectangular supporting structure, busses suspended from the upper deck, additional busses supported above the lower deck, line busses supported intermediate the upper and lower busses, and an incoming line for each line bus; each line bus having a switch extending in alignment therewith for connecting it to the corresponding line, a pair of switches extending at right angles to said switch for bypassing it, said switches being mounted at one side of the rectangular frame, a circuit breaker mounted directly below said pair of switches, and conductors extending upward to each of the switches of the pair of switches for connecting the circuit breaker in circuit with said switches.

30. In an outdoor electric station, a plurality of end to end bays, parallel main and transfer busses in each bay, the corresponding busses in the respective bays being in alignment, movable line busses in each bay at right angles to said main and transfer busses, and means carried by the line busses for establishing connections between the line busses and the main or the transfer busses at will.

31. In an outdoor switching station, four supporting columns, a rectangular frame supported by and interconnecting said columns, two of the opposite sides of the frame being at one level and the other two opposite sides at a lower level, busses suspended from said first mentioned sides and extending parallel to said second mentioned sides, movable line busses supported by the second mentioned sides of the rectangular frame, a pair of frame members parallel to the first two sides of the rectangular frame and supported by said columns below the second mentioned two sides of the frame, busses supported by the last mentioned frame members, and means for moving said movable busses into and out of electrical engagement with either the first mentioned or the last mentioned busses at will.

32. In an outdoor polyphase switching station, four supporting columns, a rectangular frame supported by and interconnecting said columns, two of the opposite sides of the frame being at one level and the other two opposite sides at a lower level, busses suspended from first mentioned sides and extending parallel to said second mentioned sides, movable line busses supported by the second mentioned sides of the rectangular frame, a pair of frame members parallel to the first two sides of the rectangular frame and supported by said columns below the second mentioned two sides of the frame, busses supported by the last mentioned frame members, means for moving said movable busses into and out of electrical engagement with either the first mentioned or the last mentioned busses at will, electric power conductors extending to one of said second mentioned opposite sides of the rectangular frame, oil circuit breakers, one for each phase, located in alignment parallel with and below the side of the frame to which the power conductors extend, and disconnect switches mounted on that same side of the frame for connecting the power conductors to the movable line busses in circuit with the oil circuit breaker or independent thereof at will.

33. In an outdoor polyphase switching station, four supporting columns, a rectangular frame supported by and interconnecting said columns, two of the opposite sides of the frame being at one level and the other two opposite sides at a lower level, busses suspended from first mentioned sides and extending parallel to said second mentioned sides, movable line busses supported by the second mentioned sides of the rectangular frame, a pair of frame members parallel to the first two sides of the rectangular frame and supported by said columns below the second mentioned two sides of the frame, busses supported by the last mentioned frame members, means for moving said movable busses into and out of electrical engagement with either the first mentioned or the last mentioned busses at will, electric power conductors extending to one of said second mentioned opposite sides of the rectangular frame, oil circuit breakers, one for each phase, located in alignment parallel with and below the side of the frame to which the power conductors extend, and disconnect switches mounted on that same side of the frame for connecting the power conductors to the movable line busses in circuit with the oil circuit breaker or independently thereof at will, said disconnect switches including means for shunting the oil circuit breakers and for then disconnecting them from the circuit.

34. An electric switch including two switching units each having a rotatable insulator and a blade actuated thereby, and a connecting member supported by the free ends of the two insulators and bracing them.

35. An electric switch including two switching units each having a rotatable insulator and a blade actuated thereby, a connecting member supported by the free ends of the two insulators and bracing them, and bearings between the connecting member and the respective insulators for permitting rotation of the insulators with respect to the connecting member.

36. An electric switch including a rotary insulator and means for bracing said insulator, a second switch having an insulator, the bracing means being common to both switches and being supported by both of the insulators.

37. An electric switch having a switch blade, a rotary insulator, means actuated by the insulator for actuating the blade and imparting a motion thereto relative to the insulator, a second switch having an insulator, and bracing means between the two insulators for preventing rotation of the blade as a rigid body with its actuating insulator.

38. In an outdoor switching station, four vertical supporting columns, a cross member extending between two adjacent columns near the top thereof, a second cross member similarly disposed between the other two columns, a polyphase bus supported from said cross members, additional cross members between the same sets of columns and disposed below and parallel to the first set of cross members, a polyphase bus mounted on said additional cross members and below said first mentioned busses, a third polyphase bus extending between said two busses, switching means carried by said last mentioned bus, and means for actuating said switching means to bring said switching means into engagement with either the upper or the lower bus at will.

39. In an outdoor switching column, four supporting columns, a rectangular frame supported by and interconnecting said columns, two of the opposite sides of the frame being at one level and the other two opposite sides at a lower level, a polyphase bus supported by said first mentioned sides, a second polyphase bus supported by the second mentioned sides of the rectangular frame below the first mentioned bus, a pair of frame members parallel to the first two sides of the rectangular frame and supported by said columns below the second mentioned two sides of the frame, a polyphase bus supported by the last mentioned frame members parallel to the first mentioned bus, and switching means mounted upon the second mentioned bus and movable into and out of electrical engagement with either the first mentioned or the last mentioned bus at will.

40. A polyphase switching station comprising a plurality of bays, a polyphase bus extending through all of the bays and comprising one conductor for each phase, a second polyphase bus also comprising one conductor for each phase and also extending through all of the bays parallel to the first mentioned bus and spaced therefrom, a third polyphase bus in each bay, said third bus including separate sets of movable members for each phase, one of the members of each set including switching means for establishing a connection to the corresponding phase conductor of the first mentioned bus and the other one of the members of each set including switching means for establishing a connection to the corresponding phase conductor of the second mentioned bus.

41. A polyphase switching station comprising a plurality of bays, a polyphase bus extending through all of the bays and comprising one conductor for each phase, a second polyphase bus also comprising one conductor for each phase and also extending through all of the bays parallel to the first mentioned bus and spaced therefrom, each bay having an additional polyphase bus including switching means mounted thereon and cooperating with the first mentioned bus, and additional switching means mounted on said additional polyphase bus and cooperating with the second mentioned bus.

42. A polyphase switching station comprising a plurality of bays, a polyphase bus extending through all of the bays and comprising one conductor for each phase, a second polyphase bus also comprising one conductor for each phase and also extending through all of the bays parallel to the first mentioned bus and spaced therefrom, each bay having an additional set of polyphase bus members including switching means cooperating with the first mentioned bus and also a set of polyphase bus members including switching means cooperating with the second bus, polyphase lines on the opposite sides of one of the bays, and switching means for connecting the outgoing lines to the two last mentioned polyphase bus members.

43. An electric switching station including a polyphase power line and switching means at one side of the station, a polyphase power line and switching means at the other side of the station, a polyphase bus extending between said switching means and connected to the respective lines by the respective switching means, a second polyphase bus and a third polyphase bus, and switching means mounted on said first mentioned polyphase bus for selectively connecting it to the second or to the third mentioned bus at will.

44. An electric switching system comprising three separate polyphase busses having the conductors thereof lying in three spaced parallel planes, switching means for establishing a connection between the corresponding phase conductors of the first and the second of said busses, said switching means being mounted on the respective phase conductors of one of said two busses, switching means for establishing a connection between the corresponding conductors of the second and the third bus, said last mentioned switching means being mounted directly on the respective phase conductors of one of said two last mentioned busses, and actuating means effective by a continuous operation to successively actuate the two sets of switching means.

45. In an electric system a horizontally disposed rotatable member supported at both ends, the support at one end thereof including a substantially vertically extending rotatable insulator stack, an actuating connection between the insulator stack and the horizontal member for rotating said member upon actuation of the insulator stack, and a pivotal mounting for the insulator stack to permit a swinging of the insulator stack about an axis at right angles to its axis of rotation, thereby reducing the bending stresses in the insulator stack when said horizontal member sags.

In witness whereof, I hereunto subscribe my name this 23d day of January, 1929.

ELIAS S. CORNELIUSSEN.

CERTIFICATE OF CORRECTION.

Patent No. 1,884,580. October 25, 1932.

ELIAS S. CORNELIUSSEN, CALLED CORNELL.

It is hereby certified that error appears in the printed specification of the above numbered patent requiring correction as follows: Page 10, strike out lines 120 to 130 inclusive, comprising claim 28, and insert instead as claim 28 –

In an outdoor switching station, four vertical supporting columns, a cross member extending between two adjacent columns near the top thereof, a cross member similarly disposed between the other two columns, busses suspended from said cross members, additional cross members between the same columns and disposed below and parallel to said first cross members, busses mounted above said additional cross members and below said first mentioned busses, a third set of busses extending between said two sets of busses, switching means carried by said last mentioned busses, and means for moving said last mentioned busses to bring said switching means into engagement with either the upper or the lower busses.;

and that the said Letters Patent should be read with this correction therein that the same may conform to the record of the case in the Patent Office.

Signed and sealed this 17th day of January, A. D. 1933.

M. J. Moore,
Acting Commissioner of Patents.

(Seal)